June 27, 1961  G. M. WIDELL ET AL  2,989,866
CANTILEVER BEAM FLOWMETER
Filed Jan. 3, 1956

INVENTORS
GEORGE M. WIDELL.
JAMES M. EASTMAN.
ARTHUR E. BROWN.
BY
ATTORNEY

United States Patent Office 2,989,866
Patented June 27, 1961

2,989,866
CANTILEVER BEAM FLOWMETER
George M. Widell and James M. Eastman, South Bend, Ind., and Arthur E. Brown, Milwaukee, Wis., assignors to The Bendix Corporation, a corporation of Delaware
Filed Jan. 3, 1956, Ser. No. 557,082
6 Claims. (Cl. 73—207)

This invention relates to flowmeters and more particularly to a flowmeter which measures flow as a function of the deflection of a beam.

In order to determine the dynamic characteristics of various hydraulic devices such as valves, governors, controls, etc., it is usually desired to measure fuel flow under transient conditions. The various pressure transducers available for measuring the drop across an orifice, and their flow, are subject to error due to the acceleration of fluid in the lead lines occasioned by the displacement of fluid in the pick-up resulting from a pressure change. Available vani-type flowmeters are subject to inertia effects and require an electronic-type integrator with its attendant lag and attenuation. It is, therefore, an object of the present invention to provide a flowmeter having very rapid response for measuring flow during transient conditions.

It is another object to provide a flowmeter which accomplishes the above objects and which is capable of producing a useful electrical signal proportional to flow on an instantaneous basis.

It is another object to provide a flowmeter having a very high resonant frequency which is capable of measuring high frequency flow pulses.

Other objects and advantages will become apparent from the following specification taken in connection with the accompanying drawings, in which.

Figure 1:
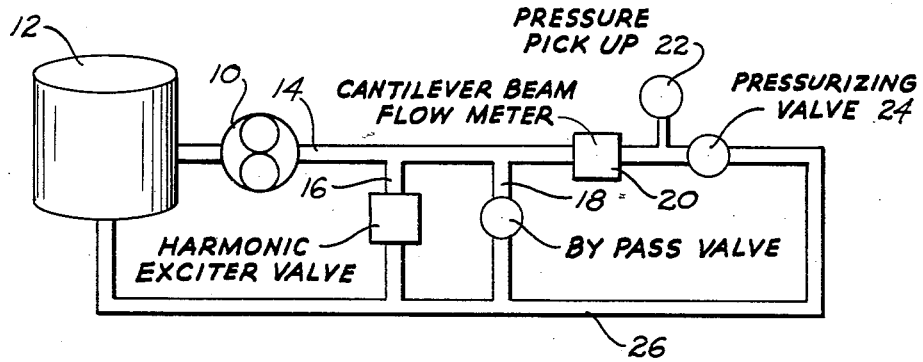
FIGURE 1 is a schematic drawing of a test installation showing the manner in which the cantilever beam flowmeter was used to measure flow during transient conditions.

Referring to FIGURE 1, a pump 10 is shown pumping a liquid from a reservoir 12. This liquid is forced along a conduit 14 and part of it is by-passed to the inlet side of the reservoir 12 through two by-pass conduits 16 and 18. Fluid not by-passed is caused to flow through the cantilever beam flowmeter 20 past a pressure pick-up 22, a pressurizing valve 24 and back to the inlet side of the reservoir 12 through a conduit 26. By-pass branch 16 contains a device for imparting a sinusoidal pulsation to the liquid flow through said branch and, inasmuch as this flow is a direct subtraction from the main flow in conduit 14, the main flow then also receives a sinusoidal pulsation. By-pass channel 18 provides a means for varying the general pressure level to the cantilever beam flowmeter 20. The pressurizing valve 24 is placed in the system to simulate a pressure level such as that found upstream of a fuel injection nozzle. Pressure pick-up 22 measures the pressure upstream of pressurizing valve 24. This pressure is directly proportional to flow—the same flow as that measured by the by the cantilever beam flowmeter 20. In test runs wherein the outputs of the pressure pick-up and the flowmeter were simultaneously plotted on an oscillograph, it was found that the sinusoidal patterns are substantially identical—even for frequency pulsations of the order of 1000 cycles per second.

Figures 2, 3:
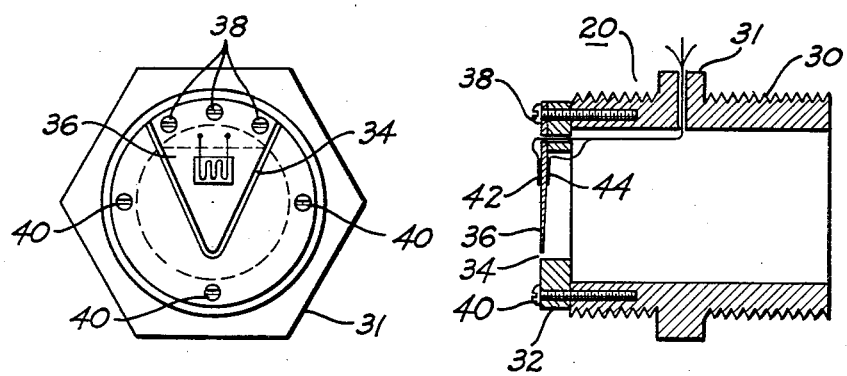
FIGURE 2 is a sectional view of a conduit containing our cantilever beam flowmeter.
FIGURE 3 shows the conduit and the cantilever beam flowmeter at right angles to the view of FIGURE 2 in order to show the fluid flow passage through the flowmeter.

Referring now to FIGURE 2, the flowmeter 20 is shown generally as a threaded conduit 30 having a hexagonal portion 31 to aid in fastening itself to a pipe. Attached at one end of the conduit 30 is a structure 32 which serves as a mounting structure and to partially define an orifice 34. A metal beam 36 is attached to member 32 and to conduit 30 by means of screws 38. Other screws 40 serve to attach the lower portion of structure 32 to conduit 30. Bonded to opposite sides of metal beam 36 is a pair of resistance-type strain gauges 42, 44. These gauges are so placed along the cantilevered beam 36 that any deflection will result in a change in resistance of the gauges and a resulting change in output signal. Although the flowmeter will operate with one gauge, the use of two gauges as shown provides greatly improved performance in that temperature compensation is provided and the output is much larger. It will be noted that portion 32 contains a radial passage for conducting the wires from the inside of the conduit 30 to an external circuit (not shown). In practice it has been found desirable to connect the strain gauges as branches in a resistance bridge, but this structure forms no part of the present invention.

It will be noted that beam 36 is shown as V shaped in FIGURE 3 and as having a tapered cross-section in FIGURE 2. Both of these devices are used to aid in producing an input vs. output relationship which is substantially linear over the desired operating range of the flowmeter. It has been found, however, that the face of the beam may be rectangular if the tapered cross-section is preserved. The reason for the tapered cross-section will appear from consideration of the following. Any time there is fluid flow across an orifice, the relationship may be stated as follows:

$$W_f = KA\sqrt{H}$$

where $W_f$ = weight of fluid flow.
$A$ = area of the orifice.
$H$ = head across the orifice.
$K$ = a constant.

Head is therefore proportional to weight of fluid flow squared which is not a linear relationship. This relationship appears as the dashed curve on FIGURE 4 wherein fluid flow is plotted against head or strain. However, by designing the beam 36 in such manner that its deflection produces an area of orifice 34 proportional to head, we find the following relationship holds:

$$W_f = K_2 H\sqrt{H}$$

or $$W_f \sim H^{3/2}$$

Figure 4:
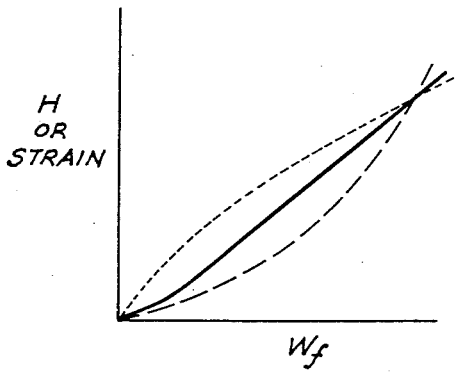
FIGURE 4 is a graph showing the characteristics of our flowmeter wherein pressure head (H) or strain is plotted against fuel flow.

This curve is also non-linear as shown on the dotted curve of FIGURE 4. It will be apparent that by making a proper choice of variable orifice area (due to bending of the beam caused by a change in flow) as compared with the fixed area at zero flow, the solid curve of FIGURE 4 may be obtained. This curve is substantially linear over a substantial flow range.

Our invention is also useful in measuring gaseous flow if the pressure ratio across the orifice exceeds the critical value ($P_1 > 1.89 P_2$) and downstream pressure ($P_2$) remains a constant. Under these conditions:

$$W_f = \frac{.53 A P}{\sqrt{T}}$$

where $W_f$ = weight of fluid flow in pounds per second
$A$ = area of a fixed orifice in square inches
$P$ = pressure upstream of the orifice in pounds per square inch
$T$ = temperature of the fluid in ° R.

This relationship is substantially linear for all values of $P_1 > 1.89 P_2$.

While only one embodiment is shown and described herein, various changes of form and size may be made to suit requirements.

We claim:

1. A device for measuring fluid flow through a conduit comprising a restriction in said conduit, a beam having a rigidly fixed point and an unsupported end projecting into said conduit adjacent said restriction in such manner as to define an orifice of known area, with the fluid in said conduit operative to deflect said beam in response to fluid flow, said beam being of such dimension that its deflection causes the area of said orifice to increase in proportion to the head across said beam, and a resistance-type strain gauge attached to each side of said beam.

2. A device for measuring the fluid flow through a conduit comprising a restriction in said conduit, a beam having a rigidly supported end and an unsupported outer end suspended into said conduit adjacent said restriction in such manner as to define an orifice, with the fluid in said conduit operative to deflect said beam in response to fluid flow, said beam being of gradually reduced cross-sectional area from its supported end to its outer end, such that its deflection causes the area of said orifice to increase in proportion to the head across said beam, and a resistance-type strain gauge bonded to said beam.

3. A device for measuring fluid flow comprising a conduit, means defining an orifice in said conduit, a beam having a rigidly fixed point suspended in said orifice in such manner as to define the area of said orifice to a known value as a function of fluid flow, with the fluid flowing through said orifice operative to deflect said beam in response to fluid flow, said beam being of gradually reduced thickness from its supported end to its extended end, and a strain gauge bonded to said beam.

4. A device for measuring the fluid flow through a conduit comprising a restriction in said conduit, a beam having a rigidly fixed point suspended in said conduit adjacent said restriction in such manner as to define an orifice, with the fluid flowing through said orifice operative to deflect said beam in response to fluid flow, said beam being of reduced thickness from its supported end to its extended end such that its deflection causes the area of said orifice to increase in proportion to the head across said beam, a resistance-type strain gauge bonded to each side of said beam, and conductors from said strain gauges passing through a wall of said conduit so as to be in an externally accessible location.

5. In a system for measuring periodic pressure pulsations in fluid flow including a source of fluid, a conduit connected to said source, and means for producing pressure pulsations in the flow through said conduit: means for measuring the magnitude and frequency of said pulsations comprising a restriction in said conduit, a beam having a rigidly fixed point suspended in said conduit adjacent said restriction in such manner as to define an orifice, with the flow of fluid passing through said orifice operative to deflect said beam in response to fluid flow, said beam being of reduced thickness from its supported end to its extended end such that its deflection causes the area of said orifice to increase in proportion to the head across said beam, a resistance-type strain gauge bonded to each side of said beam, and conductors from said strain gauge passing through a wall of said conduit so as to be in an externally accessible location.

6. A device for measuring fluid flow through a conduit comprising means defining an orifice in said conduit, a beam rigidly supported on one end and extending into said orifice so that the flow of fluid through said conduit tends to bend said beam in response to said fluid flow, and a strain gauge bonded to said beam, said beam being of maximum thickness at its supported end and tapered to a minimum thickness at its extended end.

References Cited in the file of this patent

UNITED STATES PATENTS

| | | |
|---|---|---|
| 567,054 | St. John | Sept. 1, 1896 |
| 1,111,684 | Vaughan | Sept. 22, 1914 |
| 1,574,460 | Williamson | Feb. 23, 1926 |
| 1,581,957 | Keller | Apr. 20, 1926 |
| 1,903,713 | Baule | Apr. 11, 1933 |
| 2,487,681 | Weisselberg | Nov. 8, 1949 |
| 2,675,020 | Breitwieser | Apr. 13, 1954 |
| 2,735,299 | Blackburn et al. | Feb. 21, 1956 |
| 2,765,656 | Parshall | Oct. 9, 1956 |
| 2,778,905 | Statham | Jan. 22, 1957 |
| 2,805,574 | Jackson et al. | Sept. 10, 1957 |

FOREIGN PATENTS

| | | |
|---|---|---|
| 961,641 | France | May 16, 1950 |

OTHER REFERENCES

"Pulsating-Flow Primary Measuring System," Instruments and Automation, September 1955, page 1440, vol. 28.